United States Patent
Herman et al.

(10) Patent No.: US 8,939,697 B2
(45) Date of Patent: Jan. 27, 2015

(54) SELECTIVE ORIENTATION AND BALLAST FOR A TRANSPORTABLE CONTAINER

(75) Inventors: Alvin Herman, Saskatoon (CA); Erin Herman, Saskatoon (CA)

(73) Assignee: Quickthree Solutions, Inc., Saskatoon (CA)

( * ) Notice: Subject to any disclaimer, the term of this patent is extended or adjusted under 35 U.S.C. 154(b) by 452 days.

(21) Appl. No.: 13/285,290

(22) Filed: Oct. 31, 2011

(65) Prior Publication Data

US 2013/0108402 A1    May 2, 2013

(51) Int. Cl.
*B65D 88/30* (2006.01)
*B60P 1/64* (2006.01)

(52) U.S. Cl.
CPC .................... *B60P 1/6427* (2013.01)
USPC ............... 414/332; 414/469; 414/812

(58) Field of Classification Search
USPC .......... 414/332, 469, 812; 206/459.1
See application file for complete search history.

(56) References Cited

U.S. PATENT DOCUMENTS

| 3,547,291 | A |   | 12/1970 | Batterton |         |
|-----------|---|---|---------|-----------|---------|
| 3,833,263 | A |   | 9/1974  | Jackson   |         |
| 3,848,758 | A | * | 11/1974 | Carter    | 414/469 |
| 8,152,432 | B2| * | 4/2012  | Cooper    | 414/425 |
| 2006/0120843 | A1 | * | 6/2006 | Haren | 414/469 |
| 2010/0196130 | A1 |   | 8/2010 | Lavoie et al. | |
| 2012/0024738 | A1 | * | 2/2012 | Herman et al. | 206/459.1 |
| 2012/0086185 | A1 | * | 4/2012 | Kerr et al. | 280/433 |
| 2013/0230148 | A1 | * | 9/2013 | Morton et al. | 378/198 |

* cited by examiner

*Primary Examiner* — Saul Rodriguez
*Assistant Examiner* — Emery Hassan
(74) *Attorney, Agent, or Firm* — Trego, Hines & Ladenheim, PLLC

(57) ABSTRACT

A transportable container apparatus includes an elongated container with an outlet port, and a trailer releasably attachable to the container at first and second trailer attachment locations corresponding to first and second orientations of the outlet port with respect to the trailer. An actuator mounted to the trailer is operative, when the trailer is attached to the container, to selectively move the container between a transport position where the container is supported on the trailer in a substantially horizontal orientation, and a working position where the container is supported on the ground in a substantially vertical orientation. The trailer can be attached to an appropriate location to position the outlet port in a desired orientation at a work site. Ballast weight can be added to the lower portion of the container to increase stability, and the ballasted tank with a maximum allowable weight can be transported to a work site.

17 Claims, 4 Drawing Sheets

SELECTIVE ORIENTATION AND BALLAST FOR A TRANSPORTABLE CONTAINER

This invention is in the field of transporting and installing containers such as bins, tanks, or the like, and in particular such containers that must be installed in a location at a work site with outlet ports located at a desired position, and where the desired position can change from one work site to another, and where empty stability is increased.

BACKGROUND OF THE INVENTION

In many industries it is required to set up an array of equipment at a temporary work site, and then disassemble the installation, move it to another work site, and re-assemble it. For example asphalt and concrete plants are often set up in locations where large quantities of material are required for road or building construction. Similarly well drilling rigs, such as those drilling for oil and gas, are set up at a drilling location, then taken down and moved to a different drilling location.

These portable plants and rigs typically include various tanks, bins, silos, and the like for water, asphalt, sand, cement, and other materials such as might be required at any particular work site. These are transported to the work site, commonly in a lowered horizontal transport orientation, and then raised to a vertical working orientation at the work site. For example bins containing dry material especially are often elongated vertically when in a working position to maximize the quantity of material stored above a hoppered bottom such that the dry material will flow out by gravity.

This vertical orientation also reduces the ground area, or footprint, occupied by the installation. For example in well drilling installations it is necessary to have a number of different materials located in proximity to the well being drilled, and the vertical orientation of tanks and bins facilitates such proximity. In other installations it may also be desirable to minimize the area occupied.

Bins and tanks are typically carried by flat bed trucks or trailers to the work site. The trailer is maneuvered into position, and then the container is raised from the horizontal transport position to a vertical working position resting on the ground, and the trailer is moved away from the site. A loader machine or crane can be used, or in some cases the trailer may include a tilt up deck or hoist to raise the object to the vertical, or near vertical position. Tipping and dumping vehicles are well known for a wide variety of purposes where the load carried is tilted upward from a substantially horizontal transport position.

At a work site such as an asphalt or concrete plant, oil or gas well, or the like it is generally required to orient the bin or tank so that the contents can be removed as required. Where the contents are liquid generally an outlet port with a valve is provided so that conduits can be connected to deliver the liquid where required. A pump may also be required to move the liquid to the desired location of use. Orienting the outlet port on the tank close to the use location can shorten or simplify the conduit configuration, but generally orientation of the outlet is not critical, since liquid material can readily be delivered through a conduit network. Where the location of the outlet port is more critical, extra ports can be provided to enable an operator to draw liquid out of the tank at multiple locations.

Where the contents are granular, such as sand, cement, or the like, orientation of the outlet port is more critical. Containers holding granular material typically have a hoppered bottom to direct the last granular material out through the outlet port when the container is getting empty. Thus it is not generally possible to conveniently provide multiple outlet ports on a granular material container, and the outlet port is thus in a fixed location. Granular material also cannot flow or be easily pumped through a conduit, and so it is commonly required to provide a conveyor to move the granular material from the outlet port to the use location. Such conveyors are typically fixed in length and do not have the flexibility of conduits such as hoses used for liquid material. Thus orientation of a container for granular material when it is raised to the working position is more problematic. In order to properly orient the container the trailer carrying the container must be maneuvered to get the desired orientation, often in a limited area obstructed by other tanks, bins, and equipment.

U.S. Pat. No. 3,547,291 to Batterton et al. for example discloses an erection means for a transport trailer. A bin is carried on a flatbed trailer in a horizontal orientation. The bin is pivotally attached to the rear end of the trailer, and actuators bear against the bin and trailer to pivot the bin up to the vertical position. The apparatus is configured such that when the bin is vertical the floor of the bin is on the ground. The bin is then disconnected from the trailer and actuators and the trailer is driven away.

United States Published Patent Application Number 2010/0196130 of Herman et al. discloses a transportable container and a trailer pivotally attached to one side of the container. In a working position the trailer is pivoted up to a vertical orientation along the side of the container, such that other equipment can be located closely adjacent. When it is time to relocate the container, an actuator pivots the trailer downward about the pivot axis to a transport position where the trailer rests on the ground and extends horizontally away from the container such that a hitch can be connected to a tow vehicle. When the hitch is connected to a tow vehicle, the actuator can then be operated to pivot the main body downward about the pivot axis to a lowered transport position where the main body rests on the trailer for transport in a horizontal position.

A problem with such relatively narrow and tall elongated containers is that when empty they are somewhat unstable, especially where the ground is not level, as often occurs at temporary work sites. When filled, the weight of the contents keeps the container in place but when empty, winds or accidental contact with other equipment being moved at the work site can cause the container to tip over. The stability of such containers is commonly calculated as an empty wind load rating based on the wind velocity necessary to tip the container over.

BRIEF SUMMARY OF THE INVENTION

It is an object of the present invention to provide a transportable container apparatus that overcomes problems in the prior art.

In a first embodiment the present invention provides a transportable container apparatus comprising an elongated container, and an outlet port defined in a side wall of the container. A trailer is releasably attachable to the container, and an actuator mounted to the trailer is operative, when the trailer is attached to the container, to selectively move the container between a transport position where the container is supported on the trailer in a substantially horizontal orientation, and a working position where the container is supported on the ground in a substantially vertical orientation. The trailer is releasably attachable to the container at a first trailer attachment location on an exterior of the container such that when the container is raised to the working position the outlet port is in a first orientation with respect to the trailer, and the trailer is also releasably attachable to the container at a second trailer attachment location on an exterior of the container such that when the container is raised to the working position the outlet port is in a second orientation with respect to the trailer.

In a second embodiment the present invention provides a method of transporting a container and installing same at a work site. The method comprises supporting the container in a substantially vertical orientation in a working position, the container having an outlet port defined in a side wall of the container; releasably attaching a trailer to the container at a selected one of a plurality of trailer attachment locations on an exterior of the container, the selected trailer attachment location configured such that the outlet port is in a desired trailer orientation with respect to the trailer; wherein the desired trailer orientation is determined by comparing a desired site orientation of the outlet port with available access routes of the trailer at the work site; operating an actuator mounted to the trailer to move the container from the working position to a transport position where the container is supported on the trailer in a substantially horizontal orientation, and transporting to the work site; and operating the actuator to move the container from the transport position to the working position.

In a third embodiment the present invention provides a method of stabilizing and transporting an elongated transportable container. The method comprises supporting the container on a trailer in a transport position with the container in a substantially horizontal orientation; configuring the container such that a total weight of the container and trailer is substantially equal to a maximum allowable weight for wheels supporting the trailer; configuring the container such that at least about 50% of a weight of the container is located in a bottom 25% of a length of the container; configuring the container and trailer such that a lengthwise center of gravity of the container is located on the trailer at a position such that a supported weight on the wheels supporting the trailer is substantially equal to the maximum allowable weight; towing the trailer and container to a desired work site, and moving the container to a working position where the container is in a substantially vertical orientation resting on a ground surface at the work site.

The trailer can be attached to the container in an appropriate one of the trailer attachment locations to position the outlet port in a desired orientation at a work site, where space and access routes may be limited. The container also can be provided with ballast weight in the lower end thereof to increase the empty wind load rating, and have a maximum total weight legally carried on a trailer for transport to a worksite.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE INVENTION

Figure 1:
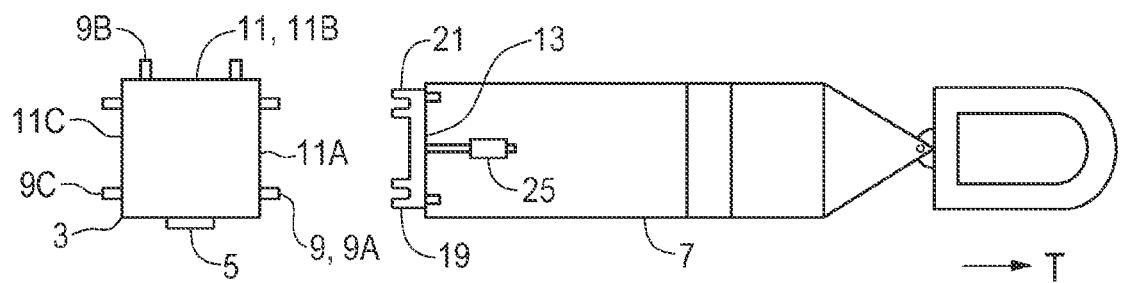
FIG. 1 is a schematic top view of an embodiment of a transportable container apparatus of the present invention where the trailer is being moved rearward to connect with a trailer attachment location on the container.

FIGS. 1-4 schematically illustrate an embodiment of a transportable container apparatus 1 of the present invention. The apparatus 1 comprises an elongated container 3, and an outlet port 5 defined in a side wall of the container 3. A trailer 7 for transporting the container to a work site is releasably attachable to the container 3 container at a plurality of attachment locations 9 on side walls of the container 3. The illustrated container 3 has a rectangular cross section with four substantially flat side walls 11, and the trailer 7 is releasably attachable to the container at first, second, and third trailer attachment locations 9A, 9B, 9C on corresponding first, second, and third side walls 11A, 11B, 11C of the container 3.

The illustrated trailer 7 comprises a container frame 13 releasably attachable to the container at the trailer attachment locations 9, and the container frame 13 is pivotally attached to the trailer 7 about a horizontal pivot axis FA oriented substantially perpendicular to an operating travel direction T of the trailer 7. In the illustrated apparatus 1, each trailer attachment location 9 is provided upper and lower pairs of brackets 15 defining holes 17. The container frame 13 includes upper and lower pairs of clevis members 19 defining holes 21 positioned to correspond with the brackets 15 such that pins 23 can be inserted through the holes 17, 21 to releasably attach the container frame 13, and thus the trailer 7, to the container 3 at one of the trailer attachment locations 9.

Figure 2:
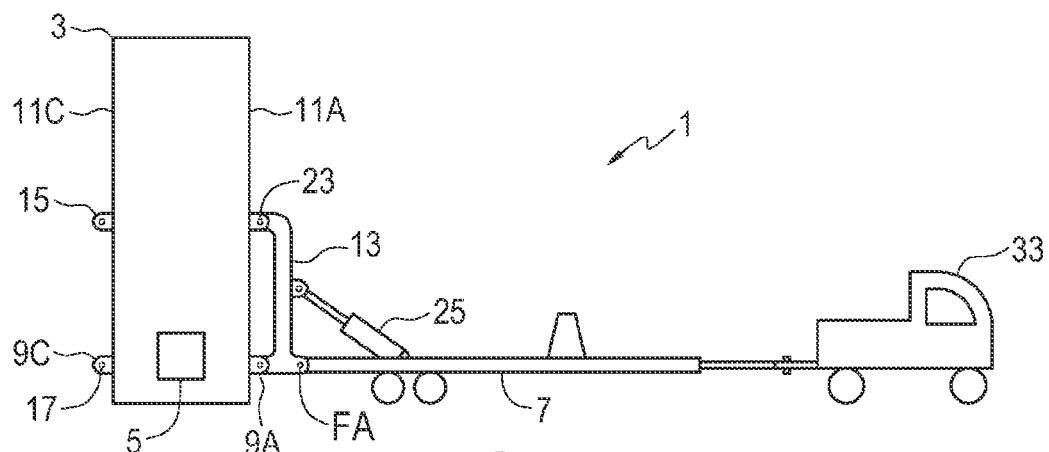
FIG. 2 is a schematic side view of the embodiment of FIG. 1 where the container is releasably attached to the trailer at the trailer attachment location, and the container is in the working position.

In FIG. 1 the trailer 7 is shown approaching the container 3 by backing toward sidewall 11A to connect the trailer 7 to trailer attachment location 9A. FIG. 2 shows the trailer moved farther rearward and with the container frame 13 releasably attached to the container 3 at trailer attachment location 9A by pins 23. It is contemplated that connection of the container frame 13 to the trailer attachment locations 9 could be by other connection and engagement mechanisms known in the art.

Figure 3:
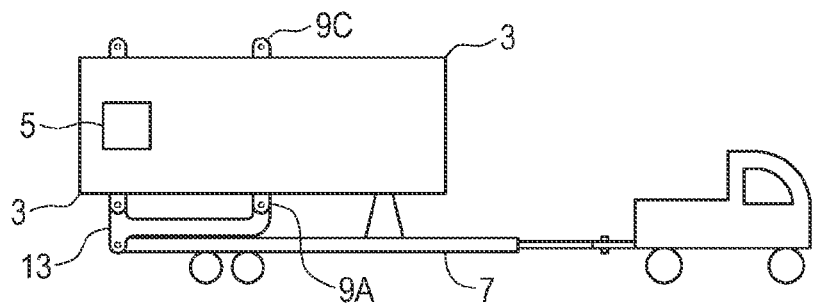
FIG. 3 is a schematic side view of the embodiment of FIG. 1 where the container is releasably attached to the trailer at the trailer attachment location, and the container is in the transport position with the outlet port in a first orientation toward the right side of the trailer.

The apparatus 1 includes an actuator 25 mounted to the trailer 7 that is operative, when the trailer 7 is attached to the container 3, to selectively move the container 3 between a working position where the container 3 is supported on the ground in a substantially vertical orientation as shown in FIG. 2, and a transport position where the container is supported on the trailer in a substantially horizontal orientation as shown in FIG. 3. In the illustrated apparatus 1, the actuator 25 comprises an extendable hydraulic cylinder pivotally attached to the trailer 7 at one end and the container frame 13 at the other end. Extending and retracting the actuator 25 pivots the container frame 13 up and down about the pivot axis FA.

The present invention thus provides a method of moving a container 3 and installing same at a work site. The method comprises supporting the container 3, with the outlet port 5 defined in a side wall 11 thereof, in a substantially vertical orientation in a working position as illustrated in FIGS. 1 and 2. The trailer 7 is moved into position to be releasably attached to the container 3 at a selected one of the plurality of trailer attachment locations 9 on the exterior of the container. The selected trailer attachment location 9 is configured such that the outlet port 5 is in a desired trailer orientation with respect to the trailer 7.

Figure 4:
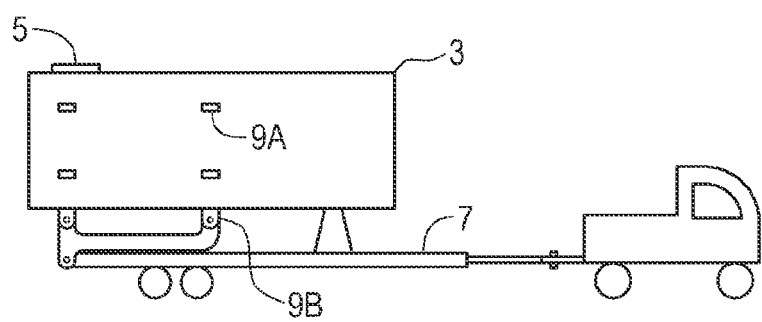
FIG. 4 is a schematic side view of the embodiment of FIG. 1 similar to FIG. 3 but where the outlet port is in a second orientation facing upward from the trailer.

FIG. 3 schematically illustrates the container 3 in the transport position when the trailer 7 is connected to trailer attachment location 9A, such that the trailer orientation of the outlet port 5 is toward the right side of the trailer 7. Alternatively if the trailer 7 is connected to trailer attachment location 9B, the trailer orientation of the outlet port 5 is upward as schematically illustrated in FIG. 4. Similarly, although not shown, if the trailer 7 is connected to trailer attachment location 9C, the trailer orientation of the outlet port 5 will be toward the left side of the trailer 7.

Figure 5:
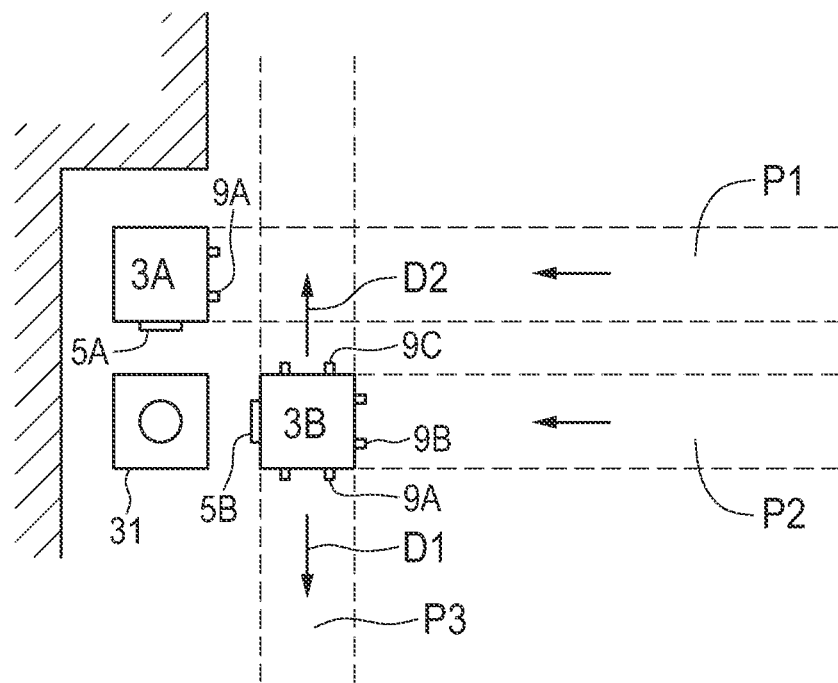
FIG. 5 is a schematic top view of a work site showing the location of two containers.

The desired trailer orientation is determined by comparing a desired site orientation of the outlet port 5 with available access routes of the trailer 7 at the work site. FIG. 5 schematically illustrates a top view of a work site showing the desired location and orientation of containers 3A and 3B, with the outlet ports 5A, 5B thereof oriented toward a well drilling platform 31 or like project. The illustrated orientation allows the contents of each container 3A, 3B to be withdrawn through the outlet ports 5A, 5B adjacent to where it is needed at the platform 31.

The available access route for container 3A is limited to path P1, so the trailer must be backed into the location. Container 3A therefore must be attached to the trailer 7 at trailer attachment location 9B in the orientation of FIG. 4 with the trailer orientation of the outlet port 5 upward.

The available access route for container 3B is much less limited. The trailer 7 could be backed into the location along path P2, and container 3B therefore could also be attached to the trailer 7 at trailer attachment location 9B in the orientation of FIG. 4 with the trailer orientation of the outlet port 5 upward.

In addition, however, the trailer 7 could also approach the platform 31 along path P3 in either forward direction D1 or D2. If approaching in forward direction D1 container 3B would be attached to the trailer 7 at trailer attachment location 9A in the orientation of FIG. 3 with the trailer orientation of the outlet port 5 toward the right side of the trailer 7. If approaching in forward direction D2 container 3B would be attached to the trailer 7 at trailer attachment location 9C with the trailer orientation of the outlet port 5 toward the left side of the trailer 7.

When the trailer 7 is attached to the selected trailer attachment locations 9 to provide the desired trailer orientation of the outlet port 5, the actuator 23 is activated to move the container 3 from the working position to the transport position and the towing vehicle 33 tows the apparatus 1 to the work site and positions the apparatus 1 so the container 3 is properly located and oriented. The actuator 25 is then operated to move the container 3 from the transport position to the working position at the work site.

The invention thus further provides a method of transporting a container 3 and installing same at first and second work sites. The method comprises transporting the container 3 and installing same at the first work site as described above. When it is desired to move the container 3, the trailer 7 is connected to the container 3 at an available trailer attachment location 9 and the actuator 25 moves the container 3 from the working position to the transport position supported on the trailer 7, and transporting the container 3 away from the first work site.

The available trailer attachment locations 9 may be limited, such as where the container 3 is located in the position of container 3A in FIG. 5, and only trailer attachment location 9B is available for connection to the trailer 7. In contrast where the container 3 is in the location of container 3B in FIG. 5, all trailer attachment locations 9A, 9B, and 9C are available.

A second desired trailer orientation of the outlet port 5 is determined by comparing a desired second site orientation of the outlet port 5 at the second work site with available access routes of the trailer 7 at the second work site. If all trailer attachment locations 9 are available at the first work site, such as with container 3B, the desired second trailer orientation of the outlet port 5 can be achieved by connecting the trailer to the appropriate trailer attachment location 9.

If however available trailer attachment locations 9 are limited at the first work site, such as with container 3A where only one trailer attachment location 9 is available, it will be necessary to connect the trailer 7 to that first trailer attachment location 9 and move the apparatus 1 to a location where the container can be repositioned. The actuator is operated move the container 3 from the transport position to the working position and the trailer 7 is released from the first trailer attachment location 9 on the container 3. The trailer is then moved and releasably attached to a second selected trailer attachment location 9 on the container 3 configured such that the outlet port 5 is in the second desired trailer orientation with respect to the trailer 5, and the actuator moves the container from the working position to the transport position supported on the trailer 7. The container is then moved to the second work site and the actuator 25 is operated to move the container 3 from the transport position to the working position at the second work site in the desired location and orientation.

Figure 6:
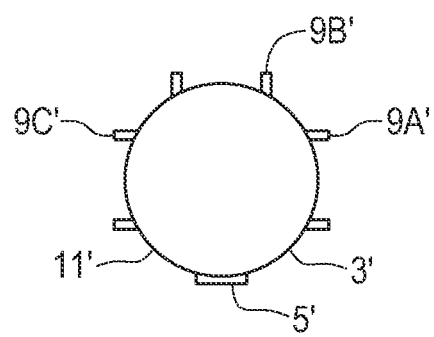
FIG. 6 is a schematic to view of a circular container of the present invention.

FIG. 6 schematically illustrates a container 3' that has a substantially circular cross section with a substantially circular side wall 11' and outlet port 5'. The trailer is releasably attachable to the container 3' at a plurality of trailer attachment locations 9A', 9B', 9C' spaced around the circular side wall 11'. In the illustrated container 3' there are three trailer attachment locations 9' spaced around the circular side wall, but more or less could be provided as warranted by the application.

Figure 7:
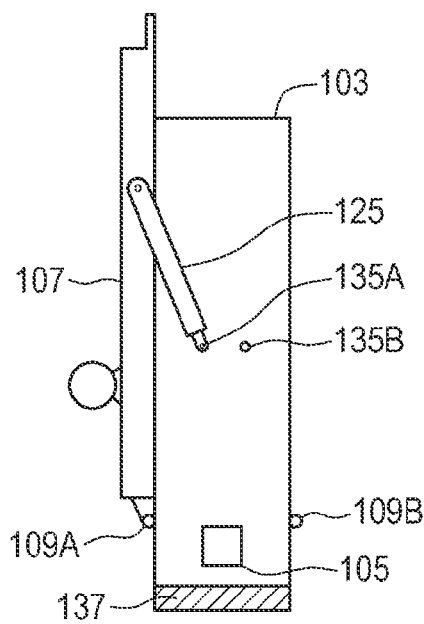
FIG. 7 is a schematic side view of an embodiment of the present invention where the trailer is drawn up vertically along the container at the work site instead of being detached, and the container is in the working position.
Figure 8:
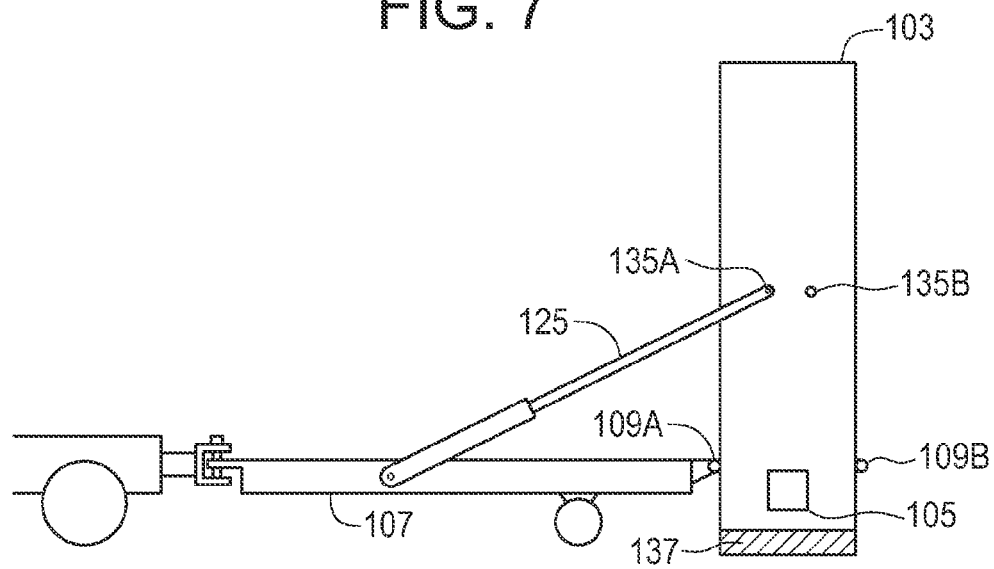
FIG. 8 is a schematic side view of the embodiment of FIG. 7 where the trailer has been lowered to a horizontal position, and the container is in the working position.
Figure 9:
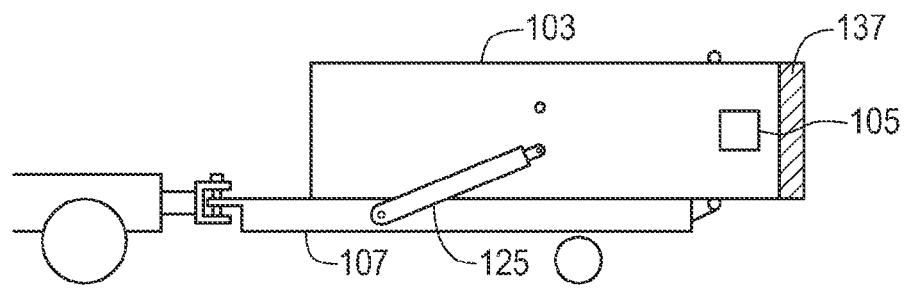
FIG. 9 is a schematic side view of the embodiment of FIG. 7 where the container has been lowered to the transport position supported on the trailer.

FIGS. 7-9 illustrate an embodiment of an apparatus 101 of the invention where the trailer 107 is pivotally attachable to the container 103 about a horizontal pivot axis FA oriented substantially perpendicular to an operating travel direction T of the trailer 107, at first and second trailer attachment locations 109A, 109B by pins, clevises, or like releasable arrangements as are known in the art. The actuator 125 comprises an extendable hydraulic cylinder pivotally attached to the trailer 107 at a first end thereof and releasably attachable at an opposite second end thereof to the container 103 at first and second actuator attachment locations 135A, 135B.

In the apparatus 101, the trailer 107 is drawn up vertically along the container 103 at the work site instead of being detached as in the apparatus 1 above. It is only required to detach the trailer 107 from the container 103 when it is necessary to change the orientation of the outlet port 105 with the trailer 107. It is contemplated that the apparatus 1 with the container frame 13 may be easier to connect and disconnect, however it is contemplated that the apparatus 101 would be satisfactory as well, as would numerous other arrangements for releasable connection and movement of the container between the working and transport positions.

In the container 103 of FIGS. 7-9 a ballast weight 137 is also provided in the bottom end of the container 103. The ballast weight 137 can for example be provided by making the lower part of the container 103 from thicker steel plate than the upper part. This method of providing the ballast weight desirably also adds strength to the lower part of the container, where stresses are greater than in the upper part. Alternatively concrete, or poured into the bottom of the container, or some like heavy material fixed to the bottom of the container could provide the ballast weight and improve stability. Loose fill, such as gravel should not be used in most cases as same will shift and move the center of gravity. The weight 137 stabilizes the container in the vertical working position when same is empty, and increases the empty wind load rating of the container 103.

It is contemplated that the weight would be selected so that the total weight of the apparatus would be legal for road travel in the jurisdiction where same would be used. Where the container 103 and trailer 107 have a weight that is legal for two axles, a third axle may be added and the ballast weight 137 would be added so that the maximum weight for a three axle trailer be about equal to or greater than the combined weight of the trailer 107 and container 103 with the ballast weight 137.

Figure 10:
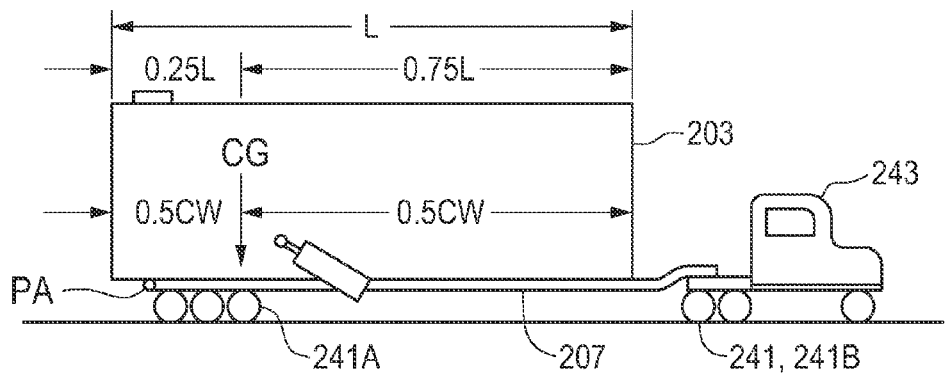
FIG. 10 schematically illustrates a ballasted container with increased stability and empty wind load rating in a horizontal transport position supported on a trailer.
Figure 11:
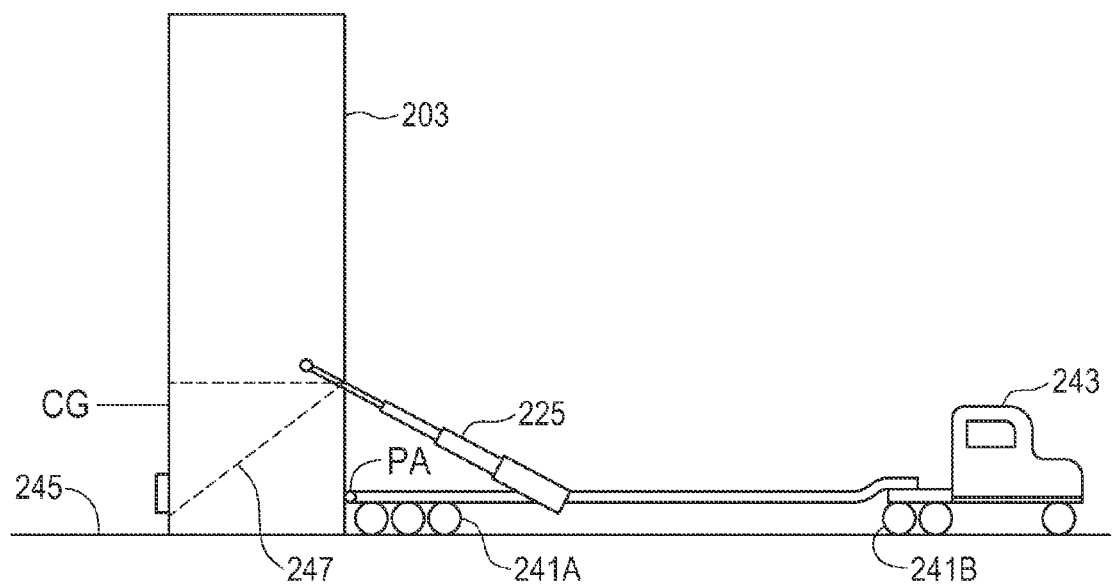
FIG. 11 schematically illustrates the container of FIG. 10 in a vertically oriented working position.

FIGS. 10 and 11 schematically illustrate a method of the invention of stabilizing and transporting an elongated transportable container 203. The method comprises supporting the container 203 on a trailer 207 in a transport position with the container in a substantially horizontal orientation as shown in FIG. 10. The container 203 is configured such that a total weight of the container and trailer is substantially equal to a maximum allowable weight for wheels 241 supporting the trailer 207.

The container 203 itself is configured such that such that at least about 50% of the weight CW of the container is located in a bottom 25% of a length L of the container 203. With a major portion of the total weight in the lower portion of the container 203, the empty wind load rating of the container 203 is significantly improved over the empty wind load rating for a conventional elongated container. In the conventional container the container walls are substantially uniform from the top to the bottom with top and bottom ends much alike. In the conventional container only the hopper floor and outlet port and door add any significant weight to the bottom of the container, such that the lengthwise center of gravity is much higher when the conventional container is oriented vertically at a work site. The higher center of gravity makes it much easier for a wind to tip the conventional container over, and thus the empty wind load rating of the container 203 of the present invention is substantially higher compared to the conventional container.

The container 203 and trailer 207 are further configured together such that the lengthwise center of gravity CG of the container 203 is located on the trailer 207 at a position such that a supported weight SW on the wheels 241 supporting the trailer 207, and thus also supporting the container 203, is substantially equal to the maximum allowable weight for those wheels 241. As schematically illustrated in FIG. 10, the trailer 207 is a tri-axle trailer with three rear axles, and with a front hitch supported on the fifth wheel of a highway tractor 243, such that the wheels 241A on the three rear axles and the rear wheels 241B of the tractor 243 support the trailer 207, with its load of the container 203. The center of gravity CG is located somewhat forward of the mid point of the three rear axles such that the weight is distributed between the wheels 241 substantially equally. For each individual container and trailer combination the appropriate location of the center of gravity CG will be calculated.

In a typical situation, a conventional tank of the same size and capacity may have a weight that can be acceptably carried on a trailer with only two rear axles, while the container 203 of the present invention has weight added so that the weight CW must be carried on a three axle trailer. The added weight is apportioned so that the desired ratio of 50% of the total container weight CW is located in the bottom 25% of the length L of the container 203.

The trailer 207, and its loaded container 203, is then towed to a desired work site and the container 203 is moved to a working position where the container 203 is in a substantially vertical orientation resting on a ground surface 245 as seen in FIG. 11.

In the illustrated embodiment, the container 203 is pivotally and releasably connected to a rear end of the trailer 207 about a pivot axis PA oriented substantially perpendicular to an operating travel direction T of the trailer 207, and an actuator 225 is operative to pivot the container 203 from the transport position of FIG. 10 to the working position of FIG. 11. As illustrated the pivot axis PA is positioned such that when the container 203 pivots to the working position a bottom end of the container 203 contacts the ground surface 245.

Figure 12:
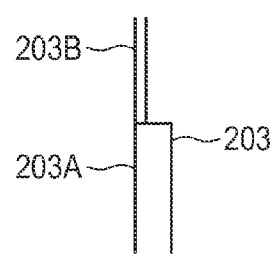
FIG. 12 schematically illustrates a container with a thicker steel plate wall on a bottom portion to add ballast weight to the container.

While in some application the trailer can remain connected to the container 203, typically the trailer 207 and actuator 225 will be released from the container 203 and the trailer will be moved away until it is time to move the container 203. At that time they will be reconnected and the actuator 225 will then be used to draw the container 203 down into the horizontal transport position on the trailer 207. Ballast weight can be added to the lower part of the container 203 to achieve the desired weight distribution. For example as schematically illustrated in FIG. 12 a lower portion 203A of the container 203 can be made from steel plate with a first thickness and an upper portion 203B of the container 203 made from steel plate with a second thickness that is less than the first thickness, so that the lower portion is heavier.

The illustrated container 203 also defines an outlet port 205 in the lower portion of the container 203, and has a hoppered floor 247 configured to direct granular material in the container 203 to the outlet port 205. The hoppered floor 247 can be configured to add weight to the lower portion of the container 203 by using extra thick plate, by adding support braces and the like that will not only add the required weight, but also strengthen the container 203.

Thus the present invention provides a transportable container apparatus where the orientation of the outlet port of the container on the trailer can be changed to facilitate positioning the container at the desired location and orientation at a crowded work site with limited room to maneuver. The apparatus is economical, requiring only simple releasable attachment points mounted to the container at various locations to which the trailer can be connected. The container also can be provided with ballast weight in the lower end thereof to increase the empty wind load rating, and have a maximum total weight for maximum wind load rating that can be supported on a trailer for transport to a worksite.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A transportable container apparatus comprising:
an elongated container, and an outlet port defined in a side wall of the container;
a trailer releasably attachable to the container, and an actuator mounted to the trailer and operative, when the trailer is attached to the container, to selectively move the container between a transport position where the container is supported on the trailer in a substantially horizontal orientation, and a working position where the container is supported on the ground in a substantially vertical orientation;
wherein the trailer and actuator are releasably attachable to the container at a first attachment location on a first side wall of the container such that when the container is raised to the working position the outlet port is in a first orientation with respect to the trailer; and
wherein the trailer and the actuator are releasably attachable to the container at a second attachment location on a second side wall of the container spaced from the first side wall such that when the container is raised to the working position the outlet port is in a second orientation with respect to the trailer that is different than the first orientation.

2. The apparatus of claim 1 wherein the trailer is pivotally attachable to first and second trailer attachment locations on the side walls of the container about a horizontal pivot axis oriented substantially perpendicular to an operating travel direction of the trailer.

3. The apparatus of claim 2 wherein the actuator comprises an extendable hydraulic cylinder pivotally attached to the trailer at a first end thereof and releasably attachable at an opposite second end thereof to the container at first and second actuator attachment locations on the first and second side wall of the container.

4. The apparatus of claim 1 wherein the trailer comprises a container frame releasably attachable to the container at the first and second attachment locations, the container frame pivotally attached to the trailer about a horizontal pivot axis oriented substantially perpendicular to an operating travel direction of the trailer.

5. The apparatus of claim 4 wherein the actuator comprises an extendable hydraulic cylinder pivotally attached to the trailer at a first end thereof and pivotally attached at an opposite second end thereof to the container frame.

6. The apparatus of claim 1 wherein the container has a rectangular cross section with four substantially flat side walls, and wherein the trailer and the actuator are releasably attachable to the container at a plurality of attachment locations on a corresponding plurality of flat side walls of the container.

7. The apparatus of claim 6 wherein the container frame of the trailer is releasably attachable to the container at first, second, and third trailer attachment locations on corresponding first, second, and third flat side walls of the container.

8. The apparatus of claim 1 wherein the container has a substantially circular cross section with a substantially circular side wall, and wherein the container frame of the trailer is releasably attachable to the container at a plurality of trailer attachment locations on side wall spaced around the circular side wall.

9. The apparatus of claim 8 wherein the trailer is releasably attachable to the container at first, second, and third trailer attachment locations spaced around the circular side wall.

10. The apparatus of claim 1 further comprising an added weight in a bottom end of the container.

11. A method of transporting a container and installing same at a work site, the method comprising:
supporting the container in a substantially vertical orientation in a working position, the container having an outlet port defined in a side wall of the container;
releasably attaching a trailer to the container at a selected one of a plurality of attachment locations on a corresponding plurality of spaced apart side walls of the container, the selected attachment location configured such that the outlet port is in a desired trailer orientation with respect to the trailer;
wherein the desired trailer orientation is determined by comparing a desired site orientation of the outlet port with an available access route of the trailer at the work site;
operating an actuator mounted to the trailer to move the container from the working position to a transport position where the container is supported on the trailer in a substantially horizontal orientation, and transporting to the work site; and
operating the actuator to move the container from the transport position to the working position.

12. A method of transporting a container and installing same at first and second work sites, the method comprising:
transporting the container and installing same at the first work site using the method of claim 11;
releasably attaching the trailer to the container at an available first attachment location on a first side wall of the container and operating the actuator to move the container from the working position to the transport position supported on the trailer, and transporting the container away from the first work site;
determining a second desired trailer orientation of the outlet port by comparing a desired second site orientation of the outlet port at the second work site with an available access route of the trailer at the second work site;
operating the actuator to move the container from the transport position to the working position and releasing the trailer from the first selected attachment location on the first side wall of the container;
releasably attaching the trailer to a second selected attachment location on a second side wall of the container spaced apart from the first side wall and configured such that the outlet port is in the second desired trailer orientation with respect to the trailer;
operating the actuator to move the container from the working position to the transport position supported on the trailer, and transporting the container to the second work site;
operating the actuator to move the container from the transport position to the working position.

13. The method of claim 11 wherein the trailer is pivotally attachable to the container at first and second trailer attachment locations on corresponding first and second side wall of the container about a horizontal pivot axis oriented substantially perpendicular to an operating travel direction of the trailer.

14. The method of claim 13 wherein the actuator comprises an extendable hydraulic cylinder pivotally attached to the trailer at a first end thereof and releasably attachable at an opposite second end thereof to the container at first and second actuator attachment locations on the first and second side wall of the container.

15. The method of claim 11 wherein the trailer comprises a container frame releasably attachable to the container at any one of the plurality of attachment locations on the exterior of the container, the container frame pivotally attached to the trailer about a horizontal pivot axis oriented substantially perpendicular to an operating travel direction of the trailer.

16. The method of claim 15 wherein the actuator comprises an extendable hydraulic cylinder pivotally attached to the trailer at a first end thereof and pivotally attached at an opposite second end thereof to the container frame.

17. The method of claim 11 further comprising stabilizing the container in the working position by adding a weight to the bottom of the container.

\* \* \* \* \*